(12) United States Patent
Dubin et al.

(10) Patent No.: US 6,962,415 B2
(45) Date of Patent: Nov. 8, 2005

(54) ELECTRO-OPTICAL DIMMING SYSTEM

(75) Inventors: Matthew B. Dubin, Scottsdale, AZ (US); Brent D. Larson, Cave Creek, AZ (US); Brian W. Walker, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 57 days.

(21) Appl. No.: 10/788,761

(22) Filed: Feb. 27, 2004

(65) Prior Publication Data

US 2005/0190345 A1    Sep. 1, 2005

(51) Int. Cl.[7] ............................................. G03B 21/14
(52) U.S. Cl. ........................................ 353/20; 353/97
(58) Field of Search ...................... 353/20, 33, 85–86, 353/93, 97; 359/494, 487, 501; 349/5

(56) References Cited

U.S. PATENT DOCUMENTS

| | | | | |
|---|---|---|---|---|
| 2,519,428 A | * | 8/1950 | Birch-Field | .................. 353/20 |
| 5,486,884 A | * | 1/1996 | De Vaan | ...................... 353/20 |
| 5,793,470 A | * | 8/1998 | Haseltine et al. | ............. 353/20 |
| 6,631,992 B2 | * | 10/2003 | Brennesholtz | ............... 353/20 |
| 2004/0032569 A1 | * | 2/2004 | Takezawa et al. | ............ 353/31 |
| 2004/0125246 A1 | * | 7/2004 | Okamori et al. | ................ 349/5 |

* cited by examiner

Primary Examiner—Christopher Mahoney

(57) ABSTRACT

An electronic dimming system for use in projection displays is provided. In a first embodiment, the dimming system comprises a first non-absorbing polarizer, a variable polarization rotator, a second non-absorbing polarizer and a heat absorber. The first non-absorbing polarizer receives light from a light source and passes the light of a selected polarization to the variable polarization rotator. The variable polarization rotator selectively rotates the polarization of the received light. The light passes from the variable polarization rotator to the second non-absorbing polarizer. The second non-absorbing polarizer passes only light of a second selected polarization. The light that passes the second non-absorbing polarizer is passed to the display, where it is used to illuminate the display. The system provides the ability to control the amount of light passed to the display by selectively rotating the polarization of the light with the variable polarization rotator.

44 Claims, 11 Drawing Sheets

ELECTRO-OPTICAL DIMMING SYSTEM

FIELD OF THE INVENTION

This invention generally relates to projection displays, and more specifically applies to dimming in projection displays.

BACKGROUND OF THE INVENTION

Various types of optical displays are commonly used in a wide variety of applications. Included among these various types of displays are projection displays. Projection displays typically involve optical relaying of the displayed image prior to viewing. A typical projection display system will often include a diffuse viewing screen. One of the attractive characteristics of many projection displays is the flexibility of configuring a system with the particular features needed for a specific application.

One important performance parameter in certain projection displays is the range of luminance that can be provided by a projection display, commonly referred to as the dimming range. In many applications it is critical that a display make information clearly visible in a wide variety of ambient light conditions. For example, a display used in an avionics control system will need to display information to the pilot under lighting conditions that can range from near total blackness to the extreme glare created by facing directly into daytime sunlight. Such a display must have a high maximum dimming ratio, where the dimming ratio is the ratio of the display luminance at highest brightness to the display luminance at its current setting. Without a sufficiently high maximum dimming ratio, a viewer of the display may be unable to easily read information from the display in high ambient light conditions, low ambient light conditions, or both. In some applications, the required maximum dimming ratio may be as little as 100:1. In other applications, a maximum dimming ratio of 20,000:1 or greater may be required to effectively display information in its expected range of ambient conditions. It should also be noted that in some applications alternative measures of light output may be used rather than luminance. In these cases, the dimming ratio can be expressed with respect to that measure. One such example might be the amount of optical power within a certain wavelength band.

Additionally, in some applications the ability to precisely control the amount of dimming is of particular importance. This is typically of greatest concern in low light conditions, where small changes in the amount of dimming can have significant effects on the viewability of the display. Unfortunately, many prior dimming solutions have been unable to provide the precise dimming control needed for many critical applications.

Thus, in many applications the projection display must be able to accurately and clearly display information through a wide dimming range, with the ability to precisely control the amount of dimming. Unfortunately, prior art solutions to dimming in projection displays have met with limited success. As mentioned above, some prior art solutions have been unable to reliably achieve the wide dimming range or the precise dimming control needed for certain critical applications. Other prior art solutions have required excessively complex structures that require large amounts of space and suffered from high cost and low reliability. Some prior art solutions have also negatively impacted the high bright state luminance required for bright ambient conditions. Other prior art solutions have been highly susceptible to malfunction caused by heat absorption. Thus, what is needed is an improved dimming system that provides a wide dimming range and precise control over the amount of dimming in a projection display.

BRIEF SUMMARY OF THE INVENTION

The present invention provides an electronic dimming system for use in projection displays. The electronic dimming system facilitates a precise control of the dimming range and provides improved reliability. In a first embodiment, the dimming system comprises a first non-absorbing polarizer, a variable polarization rotator, a second non-absorbing polarizer and a heat absorber. The first non-absorbing polarizer receives light from a light source and passes the light of a selected polarization to the variable polarization rotator. The variable polarization rotator selectively rotates the polarization of the received light. The light passes from the variable polarization rotator to the second non-absorbing polarizer. The second non-absorbing polarizer passes only light of a second selected polarization. The light that passes the second non-absorbing polarizer is passed to the display, where it is used to illuminate the display. The light not passed to the display is passed to a heat absorber, where the heat absorber absorbs the light and dissipates the associated heat away from sensitive elements in the display. The system provides the ability to control the amount of light passed to the display by selectively rotating the polarization of the light with the variable polarization rotator. Specifically, by rotating the polarization of the light to a polarization where the majority of the light is passed by the second non-absorbing polarizer, the dimmer can provide a relatively bright light to the display. In contrast, by rotating the polarization of the light to a polarization where the majority of light is not passed by the second non-absorbing polarizer, the dimmer can provide a relatively dim light to the display. The electronic dimming system can thus precisely control the amount of light passed to the display from a bright state to a dim state by selectively rotating the polarization of the light with the variable polarization rotator.

In a second embodiment, the dimming system comprises a first non-absorbing polarizer, a variable polarization rotator and a second non-absorbing polarizer. In this second embodiment, the variable polarization rotator is configured such that different spatial portions of the rotator can selectively rotate the polarization of received light in different amounts. Like the first embodiment, this embodiment provides the ability to control the amount of light passed to the display by selectively rotating the polarization of the light with the variable polarization rotator. However, in this embodiment, this is accomplished by rotating different spatial portions of light in different amounts. This can result in improved image quality. Specifically, by rotating different spatial portions of light differently dimming can be achieved with improved angular uniformity in the light output of the dimmer. Thus, this embodiment is able to precisely control the amount of light passed to the display while providing a light source with improved angular uniformity.

In a third embodiment, the dimming system comprises a first polarizer, a pair of variable polarization rotators and a second polarizer. In this third embodiment, the pair of variable polarization rotators are selected and configured to have substantially opposite angular variation. Like the other embodiments, this embodiment provides the ability to control the amount of light passed to the display by selectively rotating the polarization of the light with the pair of variable polarization rotators. However, in this embodiment a pair of rotators is used that have substantially opposite angular variation. By using such a pair of rotators, angular variation caused by one rotator can be substantially cancelled by the angular variation in the other rotator. Thus, the image quality is improved by providing improved angular uniformity in the light output in the dimmer. Thus, this embodiment is able to precisely control the amount of light passed to the display while providing a light source with improved angular uniformity.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides an electronic dimming system for use in projection displays. The electronic dimming system can facilitate a precise control of the dimming range in a projection display, and provide high throughput, low insertion loss and improved reliability. As used in this specification, the term "projection display" is a display designed to project an image to the viewer. Some types of projection displays form the image on a display screen, such as a diffuser screen. Other projection displays do not use a diffuser screen, such as collimated displays (e.g., head up displays).

Projection displays typically include a light source and a variety of display optics. Many different devices can be used as a light source, including fluorescent lamps, arc lamps and others. Also included in the projection display are display optics, which typically include an image modulator and a projection lens assembly. Light from the light source is transmitted or reflected by the image modulator to create the image, while the projection lens assembly concentrates the image on a display area. A variety of different devices can be used as image modulators, including micro-mirror devices and both transmissive and reflective liquid crystal display devices. The electronic dimming system provides the ability to accurately control the portion of light provided from the light source to the display optics and thus can be used to control the brightness of the display.

Figure 1:
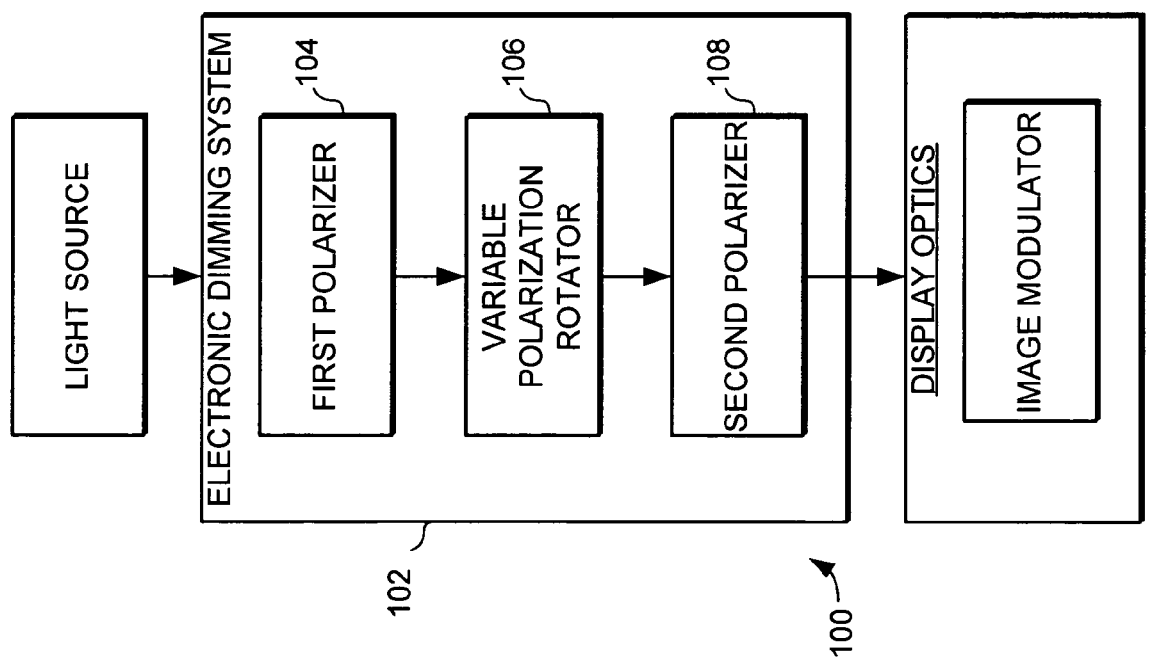
FIG. 1 is a schematic view of a portion of a projection display in accordance with an exemplary embodiment of the present invention.

Turning now to FIG. 1, a portion 100 of a projection display is illustrated schematically. The projection display includes an electronic dimming system 102. The electronic dimming system 102 is used to control the range of luminance that is provided to illuminate the display. Specifically, the electronic dimming system 102 controls the amount of light from the light source that is provided to the display optics thus determining the brightness of the display. The electronic dimming system 102 provides the ability to adjust the brightness of the display to compensate for changes in ambient light conditions. This allows the projection display to effectively display information to a user (such a pilot) in lighting conditions that can range from near total blackness to the extreme glare created by facing directly into daytime sunlight.

The electronic dimming system 102 includes a first polarizer 104 a variable polarization rotator 106 and a second polarizer 108. In general, the first polarizer 104 receives light from the light source and passes the light of a selected polarization to the variable polarization rotator 106. The variable polarization rotator 106 selectively rotates the polarization of the received light. The light passes from the variable polarization rotator 106 to the second polarizer 108. The second polarizer 108 passes only light of a second selected polarization. The light that passes the second polarizer 108 is passed to the display optics, where it is used to illuminate the display. The dimming system 102 provides the ability to control the amount of light passed to the display by selectively rotating the polarization of the light with the variable polarization rotator 106. Specifically, by rotating the polarization of the light to a polarization where the majority of the light is passed by the second polarizer 108, the dimming system 102 can provide a relatively bright light to the display. In contrast, by rotating the polarization of the light to a polarization where the majority of light is not passed by the second polarizer 108, the dimming system 102 can provide a relatively dim light to the display. The electronic dimming system 102 can thus precisely control the amount of light passed to the display from a bright state to a dim state by selectively rotating the polarization of the light with the variable polarization rotator 106.

In a first embodiment, the first polarizer and the second polarizer comprise non-absorbing polarizers and the dimming system further includes a heat absorber. In this specification, a non-absorbing polarizer is defined as a polarizer that does not use absorption as its primary means of polarization. One type of non-absorbing polarizer is a reflective polarizer such as a polarizing beam splitter. Polarizing beam splitters are polarizers that separate the different polarizations of light spatially. Another type non-absorbing polarizer is a scattering polarizer. Another type non-absorbing polarizer is a birefringent refractive polarizer. Another example of non-absorbing polarizers are polarization converters that convert light to desired polarization. A polarization converter may include one or more of the other types of polarizers. Likewise, an absorbing polarizer is one that uses absorption as its primary means of polarization. Examples of absorbing polarizers include typical dye-based or iodine-based polarizers.

The first non-absorbing polarizer receives light from a light source and passes the light of a selected polarization to the variable polarization rotator. The variable polarization rotator selectively rotates the polarization of the received light. The light passes from the variable polarization rotator to the second non-absorbing polarizer. The second non-absorbing polarizer passes only light of a second selected polarization. The light that passes the second non-absorbing polarizer is passed to the display, where it is used to illuminate the display. The light not passed to the display is passed to the heat absorber that absorbs the light and dissipates the associated heat away from sensitive elements in the display. In this embodiment, the dimming system thus provides dimming control for the projection display in a system that has relatively high heat tolerance.

In a second embodiment, polarizers comprise non-absorbing polarizers and the variable polarization rotator is configured such that different spatial portions of the rotator can selectively rotate the polarization of received light in different amounts. Like the first embodiment, this embodiment provides the ability to control the amount of light passed to the display by selectively rotating the polarization of the light with the variable polarization rotator. However, in this embodiment, this is accomplished by rotating different spatial portions of light in different amounts. This can result in improved image quality. Specifically, by rotating different spatial portions of light differently dimming can be achieved with improved angular uniformity in the light output of the dimmer. Thus, this embodiment is able to precisely control the amount of light passed to the display while providing a light source with improved angular uniformity.

In a third embodiment, the variable polarization rotator comprises a pair of variable polarization rotators selected and configured to have substantially opposite angular variation. Like the other embodiments, this embodiment provides the ability to control the amount of light passed to the display by selectively rotating the polarization of the light with the pair of variable polarization rotator. However, in this embodiment a pair of rotators are used that have substantially opposite angular variation. By using such a pair of rotators, angular variation caused by one rotator can be substantially cancelled by the angular variation in the other rotator. The image quality is improved by providing improved angular uniformity in the light output of the dimmer. Thus, this embodiment is able to precisely control the amount of light passed to the display while providing a light source with improved angular uniformity.

Figure 2:
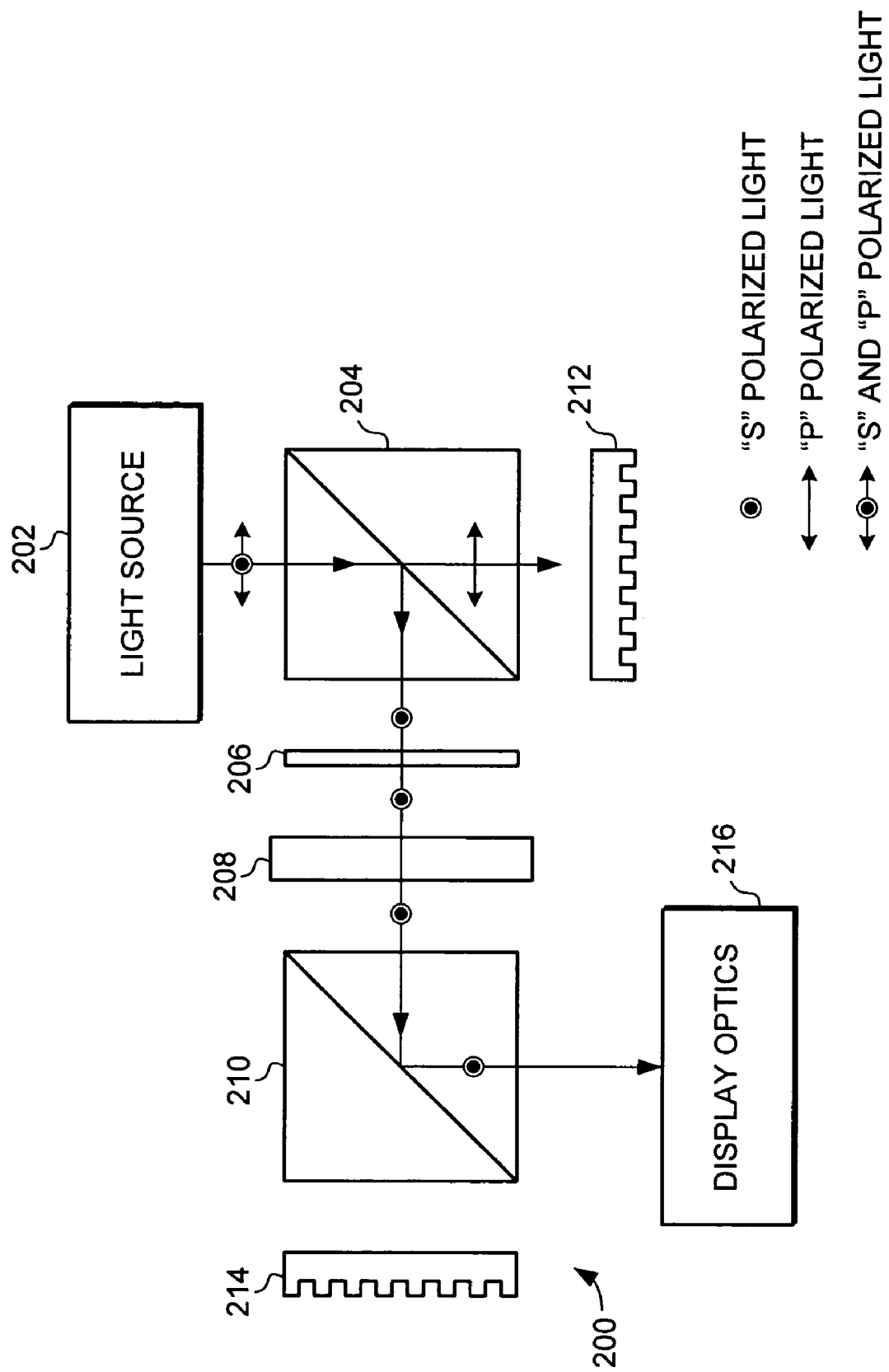
FIGS. 2 and 3 are schematic views of a first embodiment electronic dimming system.
Figure 3:
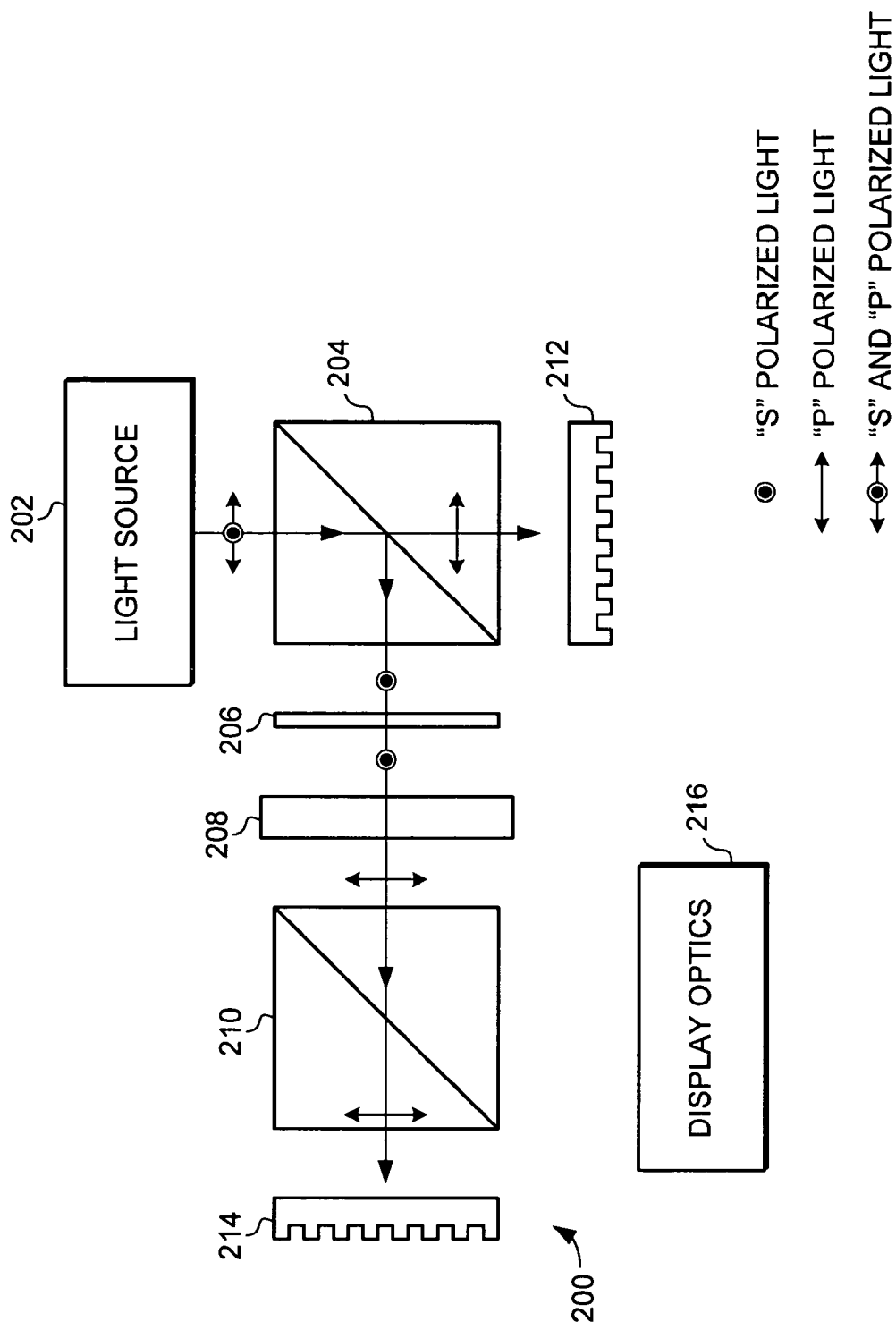

Turning now to FIGS. 2 and 3, a first exemplary embodiment of an electronic dimming system 200 is illustrated in a bright state and a dark state respectively. In this embodiment, the first and second polarizers comprise non-absorbing polarizers, and more specifically comprise polarizing beam splitters.

Specifically, the electronic dimming system 200 comprises a first polarizing beam splitter 204, a clean up polarizer 206, a variable polarization rotator 208, a second polarizing beam splitter 210, a first heat absorber 212, and a second heat absorber 214. The electronic dimming system 200 receives light from a light source 202 and passes light to display optics 216. Again, the electronic dimming system 200 is designed to provide selective control over the amount of light that is passed from the light source to the display optics, and thus control the brightness of the projection display.

In this embodiment, the polarizer beam splitters 204 and 210 can comprise any type of polarizing beam splitter. For example, cube beam splitters, mutli-layered dielectric stack beam splitters, a wire grid polarizers and birefringent polarizing beam splitter.

In this embodiment, the clean up polarizer 206 can comprise any suitable type of polarizer. For example, the clean up polarizer 206 can comprise a dye-based film polarizer, an iodine-based film polarizer, or a wire grid polarizer. As will be discussed in detail below, it will be generally desirable to implement the clean up polarizer 206 with a high transmission to minimize insertion loss. As will be described in greater detail below this can be accomplished because the amount of heat absorbed by the clean up polarizer is greatly reduced by the presence of the polarizing beam splitter 204 and heat absorber 212. It should also be noted that in some applications the use of a clean up polarizer 206 will not be desirable, and in those cases the clean up polarizer 206 can be omitted.

In this embodiment, the variable polarization rotator 208 can comprise any suitable type of polarization rotator that facilitates selective and controllable rotation of the light. For example, the variable polarization rotator 208 can comprise can comprise various types of liquid crystal cells, PLZT (lead-lanthanum-zirconium-titanate) devices, Pockels cells, Kerr cells or similar devices. Furthermore, as will be described in greater detail below, combinations of different devices can be used to implement the variable polarization rotator 208.

In this embodiment, the heat absorbers 212 and 214 can comprise a variety of different types of structures. In general, the heat absorbers 212 and 214 are designed and implemented to absorb light of undesirable polarization and dissipate the heat away from sensitive elements in the display. As such, the heat absorbers 212 and 214 are preferably thermally isolated from any such heat sensitive devices and provide a thermal path to dissipate the heat away from these devices.

During operation, the first polarizing beam splitter 204 receives light from the light source and passes the light of a selected polarization to the variable polarization rotator 208. In the illustrated embodiment, the first polarizing beam splitter 204 reflects light of a "S" polarization to the variable polarization rotator 208, while light of a "P" polarization is transmitted to the first heat absorber 212. There, the "P" polarization light is absorbed, and the resulting heat can be dissipated away from heat sensitive elements in the dimming system, such as the variable polarization rotator. Again, this helps avoid the problems that heat can cause on the variable polarization rotator, such as turning all white or all black as the result of excessive heat absorption.

The reflected "S" polarized light passes through the clean up polarizer 206. The clean up polarizer 206 removes substantially all of any remaining "P" polarized light. The "S" polarized light is then passed to the variable polarization rotator 208. The variable polarization rotator 208 can selectively rotate the polarization of the light passing through it. In the bright state, as illustrated in FIG. 2, the variable polarization rotator 208 passes the light still in the "S" polarization. In the dark state, as illustrated in FIG. 3, the variable polarization rotator 208 passes the light rotated into the "P" polarization. In the "semi-dimmed" or "semi-bright" states between the bright and dark states, the polarization of the light would be a mixture of "S" and "P" polarizations, with the percentage of "P" polarization increasing as the brightness is made closer to the dark state.

Again, in the bright state, as illustrated in FIG. 2, the variable polarization rotator 208 passes the light still in the "S" polarization to the second polarizing beam splitter 210. In the illustrated embodiment, the second polarizing beam splitter 210 is configured to reflect light of a "S" polarization to the display optics 216 and transmit light of a "P" polarization to the second heat absorber 214. Thus, in the bright state, with substantially all the light exiting the variable polarizing rotator 208 in the "S" polarization, substantially all the light is reflected to the display optics, as illustrated in FIG. 2.

In the dark state, as illustrated in FIG. 3, the variable polarization rotator 208 rotates the light to the "P" polarization. Again, in the illustrated embodiment the second polarizing beam splitter 210 is configured to transmit light of "P" polarization to the to the second heat absorber 214.

There the "P" polarization light is absorbed, and the resulting heat can again be dissipated away from heat sensitive elements in the dimming system.

In the "semi-dimmed" or "semi-bright" between the bright state and the dark state, the variable polarizing rotator 208 would rotate the light such that the light outputted from the variable polarization rotator would be a mixture of "S" and "P" polarizations. The greater the percentage of "S" polarization, the more light that is reflected to the display optics 216. The greater the percentage of light in the "P" polarization, the more light that is instead transmitted to the second heat absorber 214. Thus, the variable polarization rotator 208 would be operated to increase the percentage of "S" polarization to make the projection display brighter, and decrease the percentage of "S" polarization to make the display darker. Thus, with the variable polarization rotator 208 the dimming system 200 is able to effectively control the luminance of the light provided to the display.

It should be noted that the illustrated embodiment is one in which the first polarizing beam splitter 204 is configured to reflect the light of the desirable polarization to the variable polarization rotator 208 and transmit the light of the other polarization to the first heat absorber 212. The polarizing beam splitter 204 could instead be configured to transmit light of the desirable polarization to the variable polarization rotator 208 and reflect light of the other polarization to the heat absorber 212. In general it is desirable to configure the polarizing beam splitter 204 as illustrated because most commercially available polarizing beam splitters have lower insertion loss in the reflected state. Thus, when configured as illustrated, the polarizing beam splitter 204 will reflect substantially all of the "S" polarized light to the variable polarization rotator 208 with little insertion loss. However, most commercially available polarizing beam splitters also will reflect a small portion of the unwanted polarization.

In the illustrated embodiment, this unwanted reflected "P" polarized light is removed with clean up polarizer 206. The clean up polarizer 206 can remove any remaining "P" polarized light with little additional insertion loss as it can be selected to be highly transparent to "S" polarization. Additionally, because the majority of "P" polarized light was removed by the polarizing beam splitter 204, the clean up polarizer 206 is not required to absorb large amounts of "P" polarized light and thus is will not need to absorb or dissipate large amounts of heat. Furthermore, because the majority of "P" polarized light was removed, the transmittance of clean up polarizer 206 to "S" polarization can be kept relatively high. It should finally be noted that in some applications where a lower dimmer ratio is required, the clean up polarizer 206 can be eliminated entirely.

If the alternative configuration is used, with the polarizing beam splitter 204 configured to transmit light of the desirable polarization to the variable polarization rotator 208 and reflect light of the other polarization to the heat absorber 212, the resulting electronic dimmer will likely have a higher insertion loss, and thus lead to a darker bright state. However, in some embodiments, this configuration may be desirable as a clean up polarizer such as clean up polarizer 206 is less likely to be needed to achieve high dimming ratios.

Likewise, the second polarizer beam splitter 210 could also be configured to instead transmit light of the "desirable polarization" to the display optics and reflect light of the other polarization to the second heat absorber 214.

In an alternative embodiment, the first and/or second polarizing beam splitters can be configured in different orientations to change the amount of polarization that results. This can then be compensated for by a corresponding change to the operation of the variable polarization rotator. In another variation, the variable polarization rotator is set off axis. Generally, the variable polarization rotator would be set at an angle that results in the blackest dark state possible.

Figure 4:
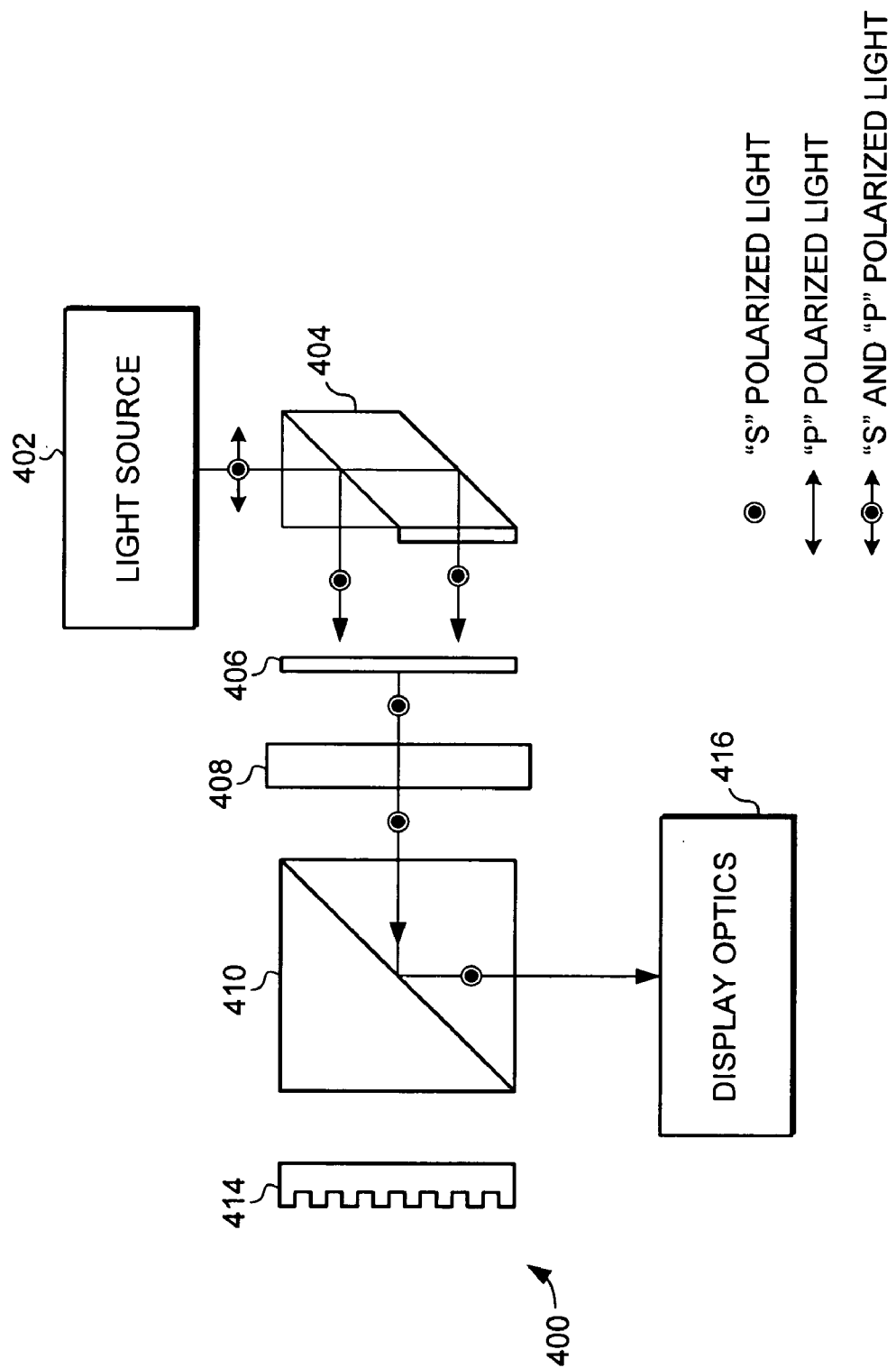
FIGS. 4 and 5 are schematic views of a second embodiment electronic dimming system.
Figure 5:
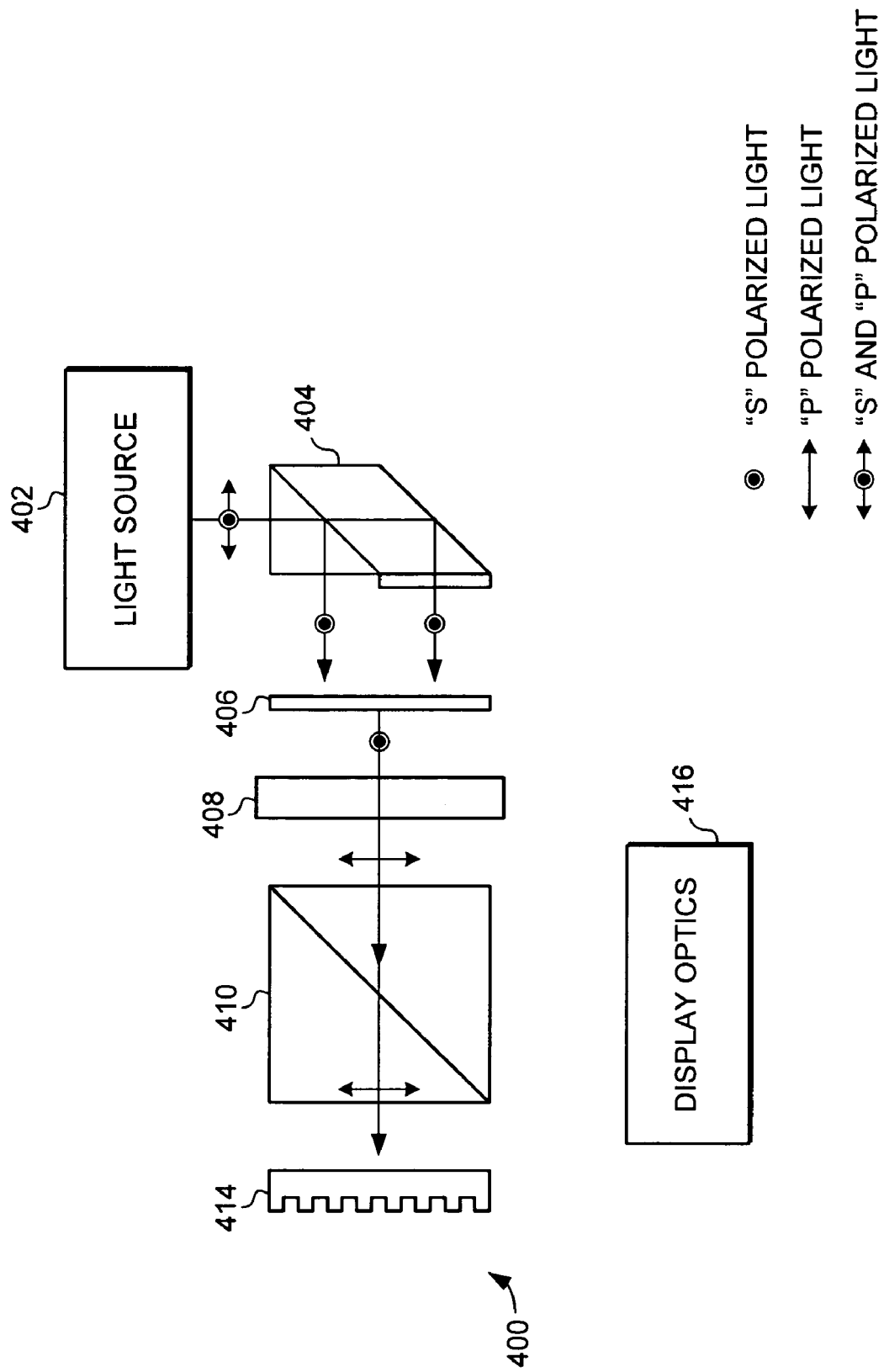

Turning now to FIGS. 4 and 5, a second exemplary embodiment of an electronic dimming system 400 is illustrated in a bright state and a dark state respectively. In this embodiment, the first polarizer comprises a polarization converter, and the second polarizer comprises a polarizing beam splitter.

Specifically, the electronic dimming system 400 comprises a polarization converter 404, a clean up polarizer 406, a variable polarization rotator 408, a polarizing beam splitter 410 and a heat absorber 414. The electronic dimming system 400 receives light from a light source 402 and passes light to display optics 416. Again, the electronic dimming system 400 is designed to provide selective control over the amount of light that is passed from the light source to the display optics, and thus control the brightness of the projection display.

This embodiment operates in a similar manner to the first embodiment, with the first non-absorbing polarizer in this embodiment instead comprising a polarization converter 404. The polarization converter 404 can comprise any suitable type of polarization converter.

Furthermore, the other elements of the dimming system 400 can be implemented in all the different varieties described reference to the first embodiment.

During operation, the polarization converter 404 receives light from the light source and converts a majority of the received light into a light of a selected polarization and passes that light to the variable polarization rotator 408. In the illustrated embodiment, the polarization converter 404 converts the light into "S" polarization. The converted "S" polarized light passes through the clean up polarizer 406. The clean up polarizer 406 removes substantially all of any remaining "P" polarized light. The "S" polarized light is then passed to the variable polarization rotator 408.

Again, the variable polarization rotator 408 can selectively rotate the polarization of the light passing through it. In the bright state, as illustrated in FIG. 4, the variable polarization rotator 408 passes the light still the "S" polarization to the polarizing beam splitter 410. In the illustrated embodiment, the polarizing beam splitter 410 is configured to reflect light of an "S" polarization to the display optics 416 and transmit light of a "P" polarization to the heat absorber 414. In the dark state, as illustrated in FIG. 5, the variable polarization rotator 408 rotates the light to the "P" polarization. Again, in the illustrated embodiment the polarizing beam splitter 410 is configured to transmit light of "P" polarization to the to the heat absorber 414. There the "P" polarization light is absorbed, and the resulting heat can again be dissipated away from heat sensitive elements in the dimming system. In the "semi-dimmed" or "semi-bright" between the bright state and the dark state, the variable polarization rotator 408 would rotate the light such that the light output from the variable polarization rotator would be a mixture of "S" and "P" polarizations.

This embodiment can provide the advantage of improved efficiency in the system since both polarizations from the source are utilized.

Figure 6:
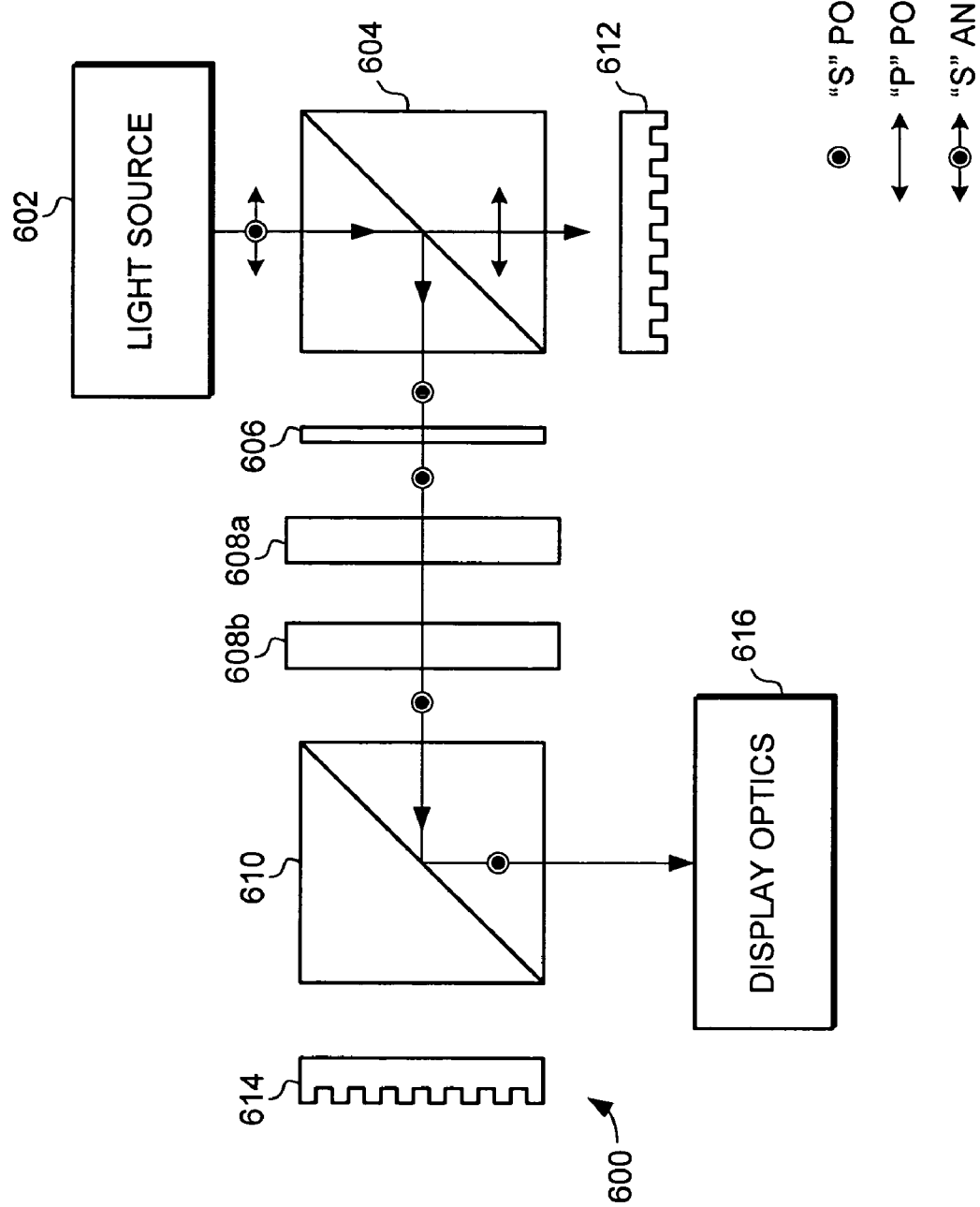
FIGS. 6 and 7 are schematic views of a third embodiment electronic dimming system.
Figure 7:
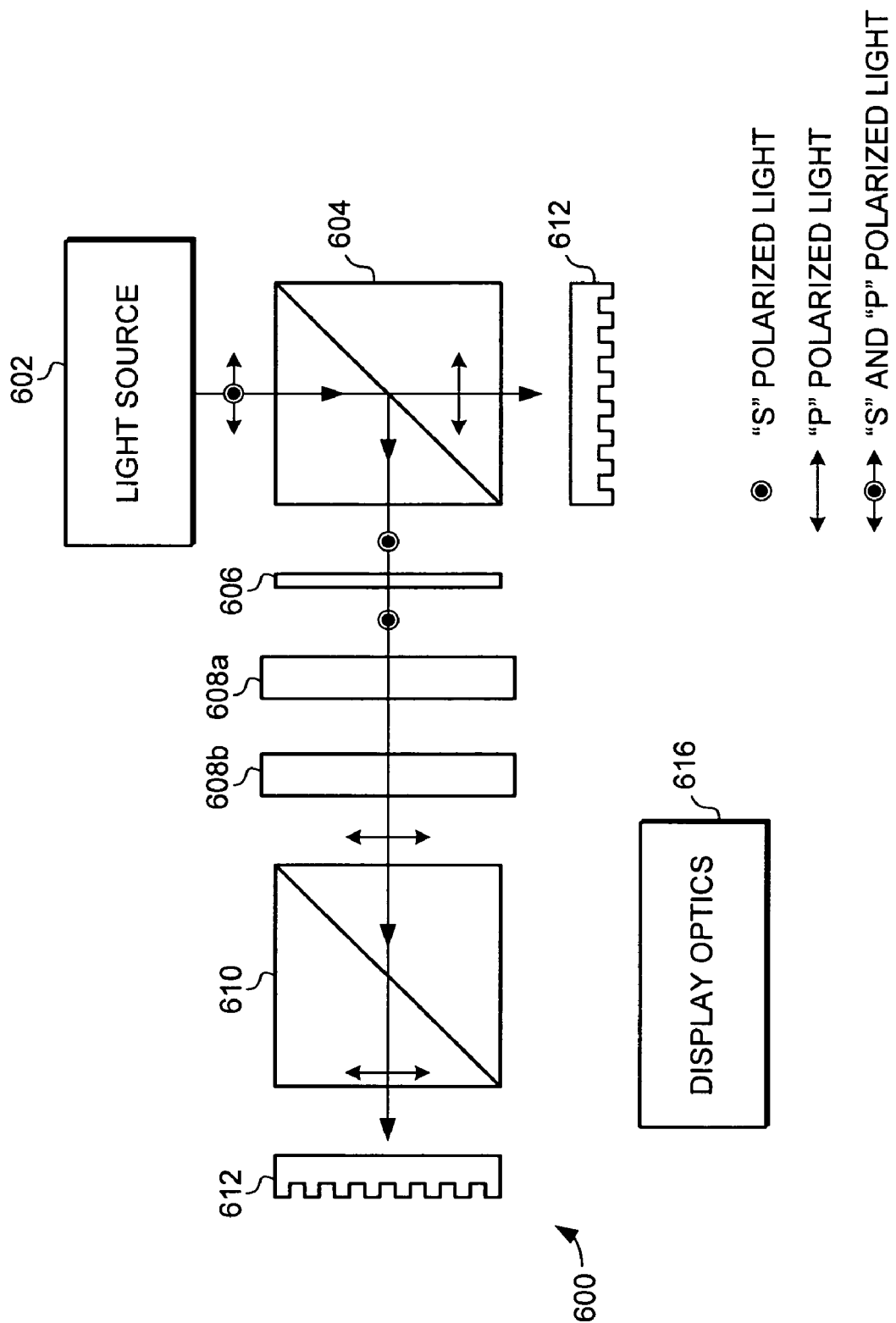

Turning now to FIGS. 6 and 7, a third exemplary embodiment of an electronic dimming system 600 is illustrated in a bright state and a dark state respectively. In this embodiment, the first and second polarizers comprise non-absorbing polarizers, and more specifically comprise polarizing beam splitters. Of course, other polarizers, including absorbing polarizers, can also be used. Furthermore, in this embodiment, the variable polarization rotator comprises a pair of polarization rotators.

Specifically, the electronic dimming system 600 comprises a first polarizing beam splitter 604, a clean up polarizer 606, a pair of variable polarization rotators 608, a second polarizing beam splitter 610, a first heat absorber 612, and a second heat absorber 614. The electronic dimming system 600 receives light from a light source 602 and passes light to display optics 616. Again, the electronic dimming system 600 is designed to provide selective control over the amount of light that is passed from the light source to the display, and thus control the brightness of the projection display.

This embodiment operates in a similar manner to the first and second embodiments, with the variable polarization rotator comprising a pair of variable polarization rotators 608*a* and 608*b*. Thus, this embodiment can be implemented with all the different varieties described with reference to the first and second embodiments.

In a preferred implementation of this embodiment, the pair of rotators 608*a* and 608*b* are selected and configured to have substantially opposite angular variation. Providing a pair of rotators with substantially opposite angular variation results in the angular variation of one rotator substantially canceling out the angular variation of the other rotator. Thus, the pair of rotators is able to provide a light source with substantially reduced angular variation overall. Angular variation could otherwise result in unwanted brightness in some areas of the screen at dimmed states.

The pair of variable polarization rotators 608*a* and 608*b* can be implemented with a variety of suitable techniques. For example, 608*a* and 608*b* can be two liquid crystal cells having similar angular characteristics but rotated 180 degrees with respect to each other. This rotation will make the two retarders complementary such that the angular variation of each compensates, at least in part, for the angular variation of the other.

During operation, the first polarizing beam splitter 604 receives light from the light source and passes the light of a selected polarization to the variable polarization rotator 608. In the illustrated embodiment, the first polarizing beam splitter 604 reflects light of a "S" polarization to the variable polarization rotator 608, while light of a "P" polarization is transmitted to the first heat absorber 612. There, the "P" polarization light is absorbed, and the resulting heat can be dissipated away from heat sensitive elements in the dimming system, such as the variable polarization rotator.

The pair of variable polarization rotators 608 can selectively rotate the polarization of the light passing through it. Again, in the bright state, as illustrated in FIG. 6, the pair of variable polarization rotators 608 transmits the light still the "S" polarization to the polarizing beam splitter 610. In the illustrated embodiment, the polarizing beam splitter 610 is configured to reflect light of an "S" polarization to the display optics 616 and transmit light of a "P" polarization to the heat absorber 614. In the dark state, as illustrated in FIG. 7, the pair of variable polarization rotators 608 rotates the light to the "P" polarization. Again, in the illustrated embodiment the polarizing beam splitter 610 is configured to transmit light of "P" polarization to the to the heat absorber 614. There the "P" polarization light is absorbed, and the resulting heat can again be dissipated away from heat sensitive elements in the dimming system. In the "semi-dimmed" or "semi-bright" between the bright state and the dark state, the pair of variable polarizing rotators 608 would rotate the light such that the light output from the pair of variable polarization rotators would be a mixture of "S" and "P" polarizations.

This embodiment provides the potential advantage of reducing or eliminating any angular bias in the dimmed illumination light from the dimmer, that could otherwise result in non-uniformity in the displayed image.

It should also be noted that while the illustrated embodiment shows a pair of variable polarization rotators, that sets of variable polarization rotators having more than two rotators can also be used. Such a set would again be configured to canceling out the angular variation in rotators. In should also be noted that additional elements, such as a polarizer, may be included between the rotators to enhance the maximum dimming range.

Figure 8:
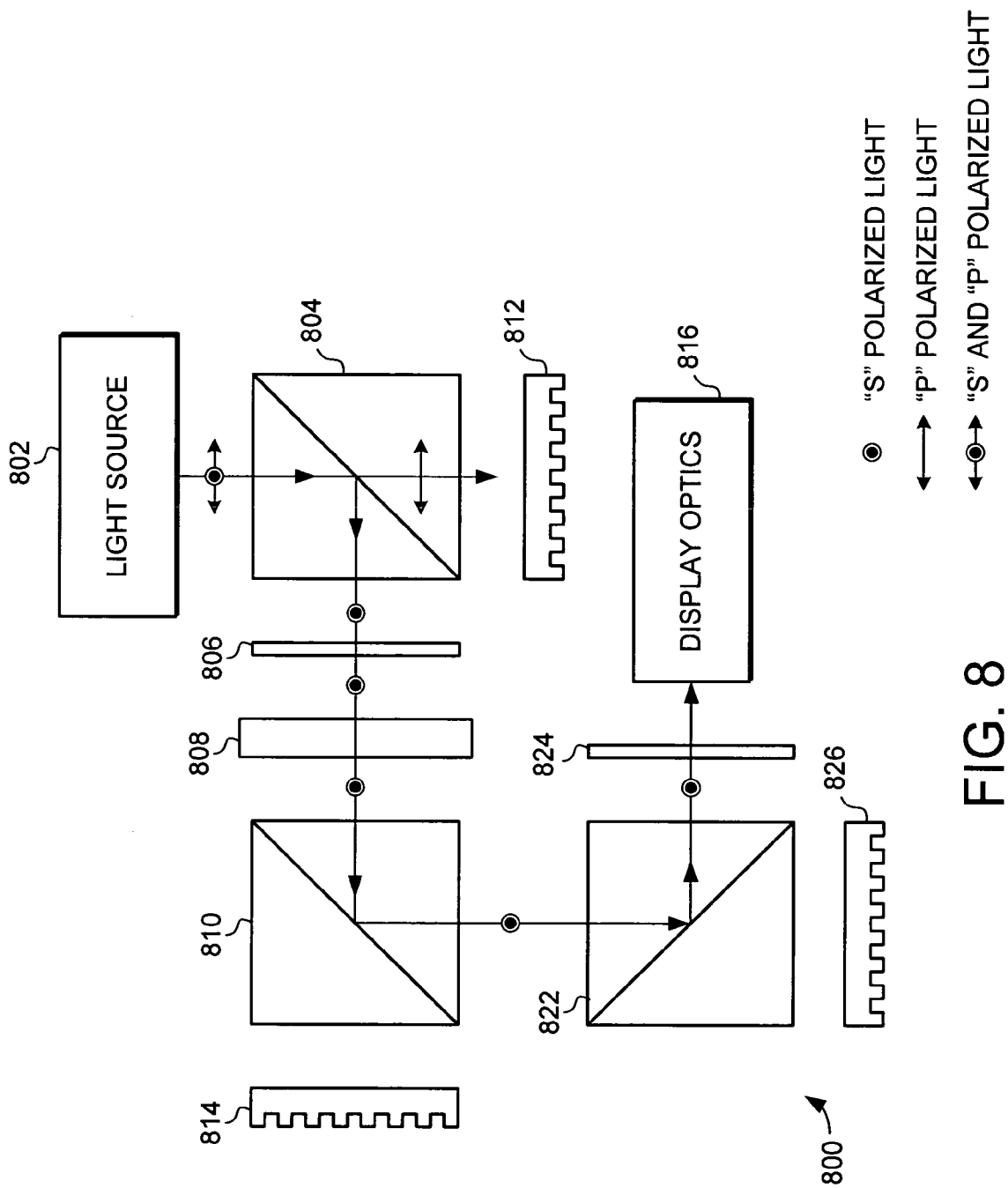
FIGS. 8 and 9 are schematic views of a fourth embodiment electronic dimming system.
Figure 9:
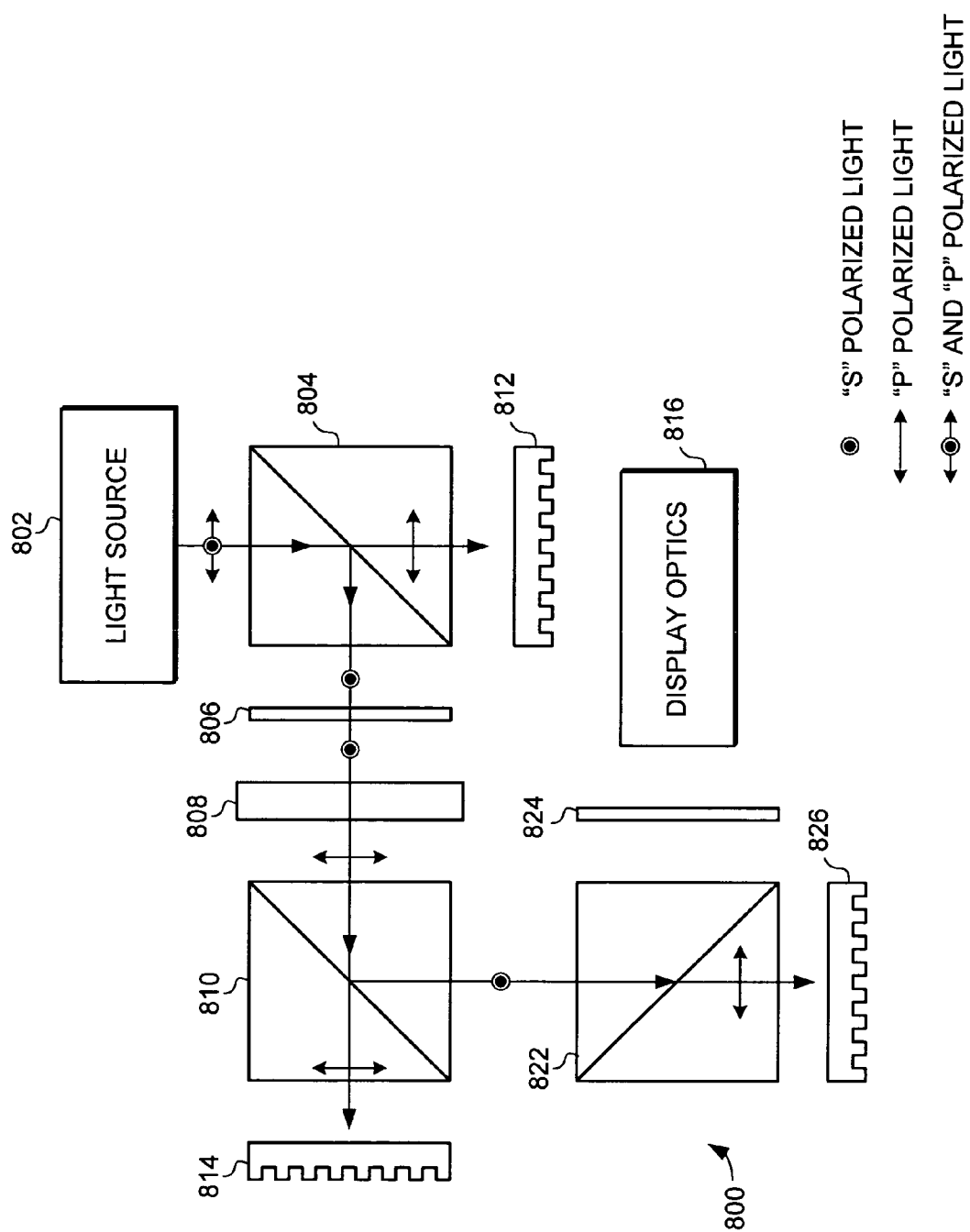

Turning now to FIGS. 8 and 9, a fourth exemplary embodiment of an electronic dimming system 800 is illustrated in a bright state and a dark state respectively. In this embodiment, the first and second polarizers comprise non-absorbing polarizers, and a third non-absorbing polarizer is added. More specifically, the first, second and third polarizers comprise polarizing beam splitters.

Specifically, the electronic dimming system 800 comprises a first polarizing beam splitter 804, a clean up polarizer 806, a variable polarization rotator 808, a second polarizing beam splitter 810, a first heat absorber 812, a second heat absorber 814, a third polarizing beam splitter 822, a second clean up polarizer 824 and a third heat absorber 826. The electronic dimming system 800 receives light from a light source 802 and passes light to display optics 816. Again, the electronic dimming system 800 is designed provide selective control over the amount of light that is passed from the light source to the display, and thus control the brightness of the projection display.

This embodiment operates in a similar manner to the earlier embodiments, with the addition of the third polarizing beam splitter 822 and third heat absorber 826. Thus, this embodiment can be implemented with all the different varieties described with reference to the first, second and third embodiments. The third polarizing beam splitter 822 and third heat absorber 826 provides a fold in the optical path and improves the polarization contrast for typical polarization beam splitters. This embodiment is thus especially desirable where a fold in the optical path is desirable for device geometry reasons, as it provides the fold in the path and also improves the contrast of the dimmer.

During operation, the first polarizing beam splitter 804 receives light from the light source and passes the light of a selected polarization to the variable polarization rotator 608. In the illustrated embodiment, the first polarizing beam splitter 804 reflects light of a "S" polarization to the variable polarization rotator 808, while light of a "P" polarization is transmitted to the first heat absorber 812. There, the "P" polarization light is absorbed, and the resulting heat can be dissipated away from heat sensitive elements in the dimming system, such as the variable polarization rotator.

The variable polarization rotator 808 can selectively rotate the polarization of the light passing through it. Again, in the bright state, as illustrated in FIG. 8, the variable polarization rotator 808 passes the light still the "S" polarization to the polarizing beam splitter 810. In the illustrated embodiment, the polarizing beam splitter 810 is configured to reflect light of an "S" polarization to the third polarizing beam splitter 822 and transmit light of a "P" polarization to the heat absorber 814. In the bright state, the third polarizing beam splitter 822 reflects the light of "S" polarization to the second clean up polarizer 824, where it is then passed to the display optics 816.

In the dark state, as illustrated in FIG. 9, the variable polarization rotator 808 rotates the light to the "P" polarization. Again, in the illustrated embodiment the polarizing beam splitter 810 is configured to transmit light of "P" polarization to the to the heat absorber 814. There the "P" polarization light is absorbed, and the resulting heat can again be dissipated away from heat sensitive elements in the dimming system. In the "semi-dimmed" or "semi-bright" between the bright state and the dark state, the pair of variable polarizing rotators 808 would rotate the light such that the light output from the pair of variable polarization rotators would be a mixture of "S" and "P" polarizations.

In both bright and dark states, any additional light of "P" polarization that reaches the third polarizing beam splitter 822 is transmitted to the third heat absorber 826, where it can be dissipated away. In the dark state, this helps further minimize light that gets passed to the display. In the bright state, the addition of the third polarizing beam splitter 822 does not appreciably increase insertion loss when the polarizing beam splitter 822 is selected to be over-reflective, e.g., reflecting all of the desired polarization and some small portion of the undesired polarization.

The addition of the third polarizing beam splitter 822 allows a high efficiency clean up polarizer 824 to be used without compromising the dark state. Thus, the addition of the third polarizing beam splitter can both improve the brightness of the bright state and the darkness of the dark state. This embodiment thus provides the advantage of increased dimming ratio without an increase in overall insertion loss. Again, this embodiment is especially desirable where a fold in the optical path is desirable for device geometry reasons, as it provides the fold in the path while also improving the contrast of the dimmer.

All of the above embodiments can be implemented in a variety of structures. As one example, in many implementations it will be desirable to image the variable polarization rotator or rotators to the aperture stop of the projection lens. Imaging the variable polarization rotator to the aperture offers several potential advantages. For example, it limits the effects of unwanted angular variations in the variable polarization rotator on the final image. Furthermore, as will be described in greater detail below, it also facilitates the use of spatial variation as a dimming mechanism. In other implementations it will be desirable to image the light source to the aperture stop. This configuration is well suited to the embodiments illustrated in FIGS. 6 and 7.

Figure 10:
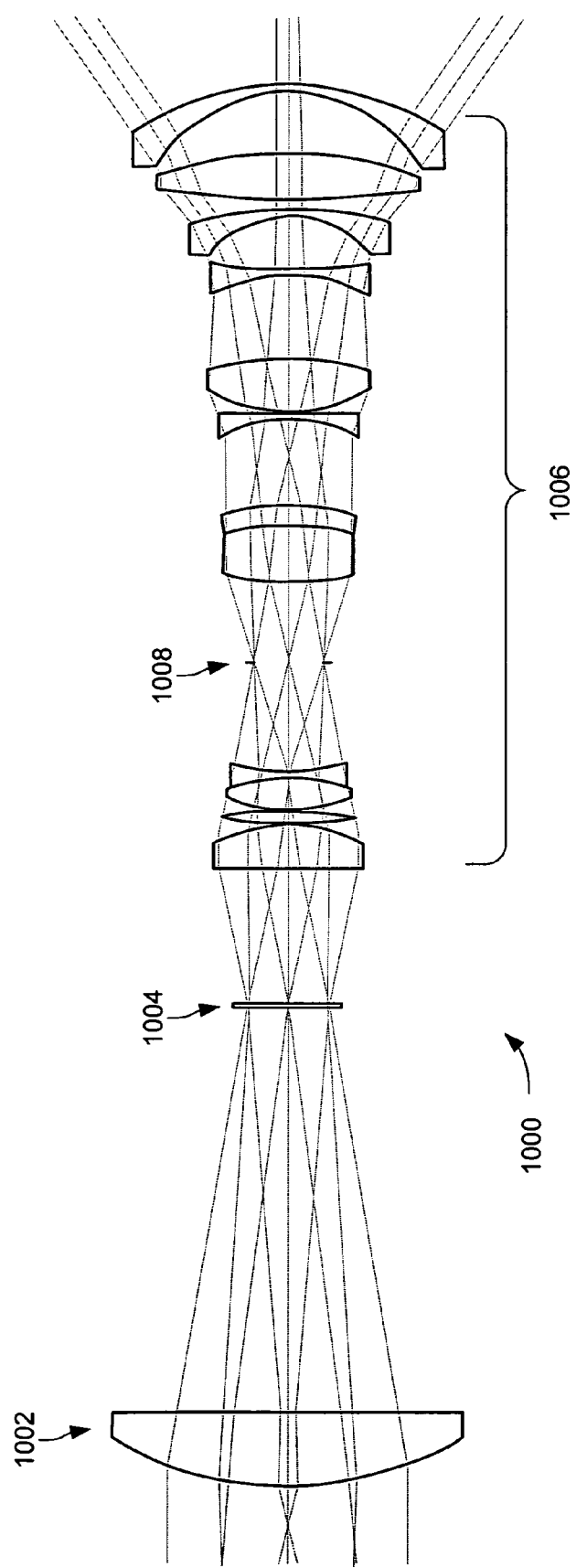
FIG. 10 is a schematic view of an illumination lens system in accordance with an embodiment of the invention.

Turning now to FIG. 10, a simplified example of a display optics 1000 that can be used in projection display. The display optics 1000 receives light from a light source that can be controllably dimmed using an electronic dimming system, creates an image with an image modulator (e.g., LCD), and concentrates the light on a display area (e.g., a diffusing screen or a virtual image location in a collimated display). Again, the display optics 1000 is just one example of the type of system that can be used with the electronic dimming systems of the present invention.

The display optics 1000 includes an illumination lens 1002, an LCD 1004 and a projection lens assembly 1006 that includes an aperture stop 1008. The lens 1002 receives light from the electronic dimming system and concentrates the light on the LCD 1004. The LCD 1004 modulates the light to create an image on the projection display. The projection lens assembly 1006 serves the focus that image at the desired location.

The aperture stop 1008 is a part of the projection lens assembly. The aperture stop 1008 is an effective opening which limits the spatial extent of on axis light. As stated above, in many applications it is desirable to image the variable polarization rotator at the aperture stop. This can generally be accomplished by appropriately position the rotator relative to lens 1002. Imaging the variable polarization rotator at the aperture stop improves the resulting image by reducing the effects of unwanted angular variations in the variable polarization rotator on the final image. It should be noted that the display optics 1000 is only one simplified example of the type of lenses and aperture stops that can be configured in the display optics of a projection display. Furthermore, it should be noted that the illustrated LCD is only one type of image modulator 1004 that can be used to define the image, and that other light valves such as micromirrors or reflective LCDs can also be used.

In another embodiment of the present invention, the variable polarization rotators are configured such that different spatial portions of the rotator can selectively rotate the polarization of the received light in different amounts. Thus, the amount of light passing through the electronic dimming system is controlled by spatial changes in the variable polarization rotator. In the previous embodiments, variable polarization rotators were configured to rotate all light passing through the rotator in substantially the same amount. In contrast, in this embodiment different spatial portions of the rotator are operated to rotate different portions of light in different amounts. For example, some spatial portions of light can be rotated a full 90 degrees, while other portions are not rotated at all. The amount of dimming can then be controlled by changing the percentage of spatial portions in the rotator that rotate 90 degrees versus the percentage of spatial portions that are not rotated at all. As another example, some spatial portions can be rotated 90 degrees, other spatial portions partially rotated and still other spatial portions not rotated at all.

In general, configuring the variable polarization rotator to spatially vary the rotation offers several potential advantages. For example, many LC cells exhibit stable polarization behavior when driven to a saturation voltage, both in terms of angular effects and in environmental effects. By keeping portions of the rotator saturated, at one extreme or the other, the overall stability and uniformity can be improved.

Figure 11C:
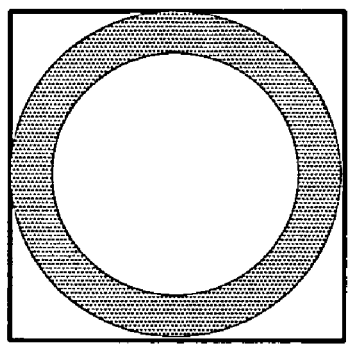
FIG. 11 is a schematic view of exemplary spatial variation techniques in accordance with an embodiment of the invention.
Figure 11B:
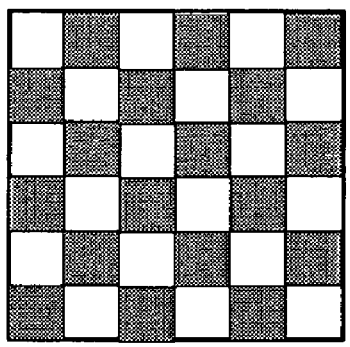
Figure 11A:
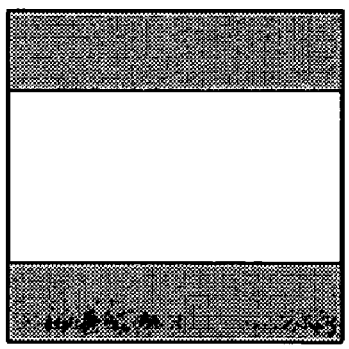

Turning now to FIG. 11, several examples of spatial variation techniques are illustrated. Specifically, FIG. 11*a* illustrates an exemplary spatial variation technique where the side areas of variable polarization rotator are rotated while the center area is not. By changing the size of the side areas that are rotated, the amount of dimming can be changed.

FIG. 11*b* illustrates an exemplary spatial variation technique that uses a checkerboard type pattern. This embodiment can vary the dimming by changing the size or number of areas that are rotated.

FIG. 11*c* illustrates an exemplary annular spatial variation technique. This embodiment can vary the dimming the by changing the relative size of the rotated outer circle versus the size of the inner circle. When the rotator is imaged to the aperture stop this technique provides the ability to reduce the effective aperture stop size as the light is dimmed. Reducing the aperture stop size can improve the image quality at the dim state. This facilitates improved overall image quality by allowing the lens system to be optimized for the slower setting to reduce the cost, volume, tolerances and weight of the system, as it is often the light in the outer portions of the aperture which limit the imaging characteristics of the projection lens.

In all of these variations it will be generally desirable to image the spatially varying rotator to the aperture stop. This insures that the spatial variations in the variable polarization rotator do not appear in the final image on the display.

The present invention thus provides an electronic dimming system for use in projection displays. The electronic dimming system facilitates a precise control of the dimming range and provides improved reliability.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A dimming system in a projection display, the dimming system comprising:
    a first non-absorbing polarizer, the first non-absorbing polarizer receiving light from a light source and passing at least a portion of the light having a first selected polarization;
    a variable polarization rotator, the variable polarization rotator receiving the light having the first selected polarization from the first non-absorbing polarizer and selectively rotating the polarization of the received light;
    a first heat absorber; and
    a second non-absorbing polarizer, the second non-absorbing polarizer receiving the selectively rotated light from the variable polarization rotator and passing a first portion of the light having a second selected polarization to display optics in the projection display and passing a second portion of the light to the first heat absorber.

2. The dimming device of claim 1 wherein the first non-absorbing polarizer comprises a reflective polarizer.

3. The dimming device of claim 1 wherein the second non-absorbing polarizer comprises a reflective polarizer.

4. The dimming device of claim 3 wherein the reflective polarizer comprises a polarizing beam splitter.

5. The dimming device of claim 1 wherein at least one of the first non-absorbing polarizer and second non-absorbing polarizer comprises a scattering polarizer.

6. The dimming device of claim 1 wherein the first non-absorbing polarizer comprises a polarization converter.

7. The dimming device of claim 1 wherein the first non-absorbing polarizer comprises a reflective polarizer, and wherein the first non-absorbing polarizer reflects a portion of the light not passed in a direction away from the variable polarization rotator.

8. The dimming device of claim 1 wherein the first non-absorbing polarizer reflects a portion of the light not passed in a direction toward a second heat absorber.

9. The dimming device of claim 1 wherein the variable polarization rotator comprises a liquid crystal cell.

10. The dimming device of claim 1 wherein the variable polarization rotator comprises a pair of variable polarization rotators selected to have substantially opposite angular variation.

11. The dimming device of claim 1 wherein the variable polarization rotator is configured such that different spatial portions of the rotator can selectively rotate the polarization of the received light in different amounts.

12. The dimming device of claim 1 further comprising a third non-absorbing polarizer, the third non-absorbing polarizer receiving the light of the second selected polarization from the second non-absorbing polarizer and passing a portion of the light to the display optics.

13. The dimming device of claim 12 further comprising a clean up polarizer between the third non-absorbing polarizer and the display optics.

14. The dimming device of claim 1 further comprising a clean up polarizer between the first non-absorbing polarizer and variable polarization rotator.

15. The dimming device of claim 1 wherein the display optics in the projection display includes an image modulator to create an image on the projection display.

16. A dimming system for a projection display, the dimming device comprising:
    a first heat absorber;
    a first polarizing beam splitter, the first polarizing beam splitter receiving light from a light source and passing a first portion of the received light having a first selected polarization to a first clean up polarizer, the first polarizing beam splitter passing a second portion of the received light having a second selected polarization to the first heat absorber;
    a variable polarization rotator proximate the first clean up polarizer, the variable polarization rotator receiving the first portion of light having the first selected polarization from the first clean up polarizer and selectively rotating the polarization of the received first portion of light; and
    a second heat absorber;
    a second polarizing beam splitter, the second polarizing beam splitter receiving the selectively rotated light from the variable polarization rotator and passing a first portion of the selectively rotated light having a first selected polarization to display optics in the projection display, the second polarizing beam splitter passing a second portion of the selectively rotated light to the second heat absorber.

17. The dimming device of claim 16 wherein the variable polarization rotator comprises a liquid crystal cell.

18. The dimming device of claim 16 wherein the variable polarization rotator comprises a pair of variable polarization rotators selected to have substantially opposite angular variation.

19. The dimming device of claim 16 wherein the variable polarization rotator is configured such that different spatial portions of the rotator can selectively rotate the polarization of the received light in different amounts.

20. The dimming device of claim 16 further comprising a third polarizing beam splitter, the third polarizing beam splitter receiving the light of the second selected polarization from the second polarizing beam splitter and passing a portion of the light to the display optics.

21. The dimming device of claim 20 further comprising a second clean up polarizer between the third polarizing beam splitter and the display optics.

22. A dimming system in a projection display, the dimming system comprising:
    a first polarizer, the first polarizer receiving light from a light source and passing at least a portion of the light having a first selected polarization;

a pair of variable polarization rotators, the pair of variable polarization rotators receiving the light having the first selected polarization from the first polarizer and selectively rotating the received light, the pair of variable polarization rotators selected to have substantially opposite angular variation;

a second polarizer, the second polarizer receiving the selectively rotated light from the variable polarization rotator and passing a first portion of the light having a second selected polarization to display optics in the projection display.

23. The dimming device of claim 22 wherein the first polarizer comprises an absorbing polarizer.

24. The dimming device of claim 22 wherein the first polarizer comprises a non-absorbing polarizer.

25. The dimming device of claim 22 wherein the second polarizer comprises a non-absorbing polarizer.

26. The dimming device of claim 22 wherein the first polarizer comprises a polarization converter.

27. The dimming device of claim 22 wherein the first and second polarizers comprise polarizing beam splitters.

28. The dimming device of claim 22 wherein the first polarizer comprises a reflective polarizer, and wherein the reflective polarizer reflects a portion of the light not passed in a direction away from the variable polarization rotator.

29. The dimming device of claim 28 wherein the reflective polarizer reflects the portion of the light not passed toward a heat absorber.

30. The dimming device of claim 22 wherein the pair of variable polarization rotators comprises a liquid crystal cells having similar angular characteristics but rotated substantially 180 degrees with respect to each other.

31. The dimming device of claim 22 further comprising a third polarizer, the third polarizer receiving the light of the second selected polarization from the second polarizer and passing a portion of the light to the projection display.

32. The dimming device of claim 22 further comprising a third polarizer, the third polarizer between the pair of polarization rotators.

33. A dimming system in a projection display, the dimming system comprising:

a first non-absorbing polarizer, the first non-absorbing polarizer receiving light from a light source and passing at least a portion of the light having a first selected polarization;

a variable polarization rotator, the variable polarization rotator receiving the light having the first selected polarization from the first non-absorbing polarizer and selectively rotating the received light, wherein the variable polarization rotator is configured such that different spatial portions of the rotator can selectively rotate the polarization of the received light in different amounts;

a second non-absorbing polarizer, the second non-absorbing polarizer receiving the selectively rotated light from the variable polarization rotator and passing a first portion of the light having a second selected polarization display optics in the projection display.

34. The dimming device of claim 33 wherein the first non-absorbing polarizer comprises a reflective polarizer.

35. The dimming device of claim 33 wherein the second non-absorbing polarizer comprises a reflective polarizer.

36. The dimming device of claim 33 wherein the first non-absorbing polarizer comprises a polarization converter.

37. The dimming device of claim 33 wherein the first and second non-absorbing polarizers comprise polarizing beam splitters.

38. The dimming device of claim 33 wherein the first non-absorbing polarizer comprises a reflective polarizer, and wherein the reflective polarizer reflects a portion of the light not passed in a direction away from the variable polarization rotator.

39. The dimming device of claim 38 wherein the reflective polarizer reflects the portion of the light not passed toward a heat absorber.

40. The dimming device of claim 33 wherein variable polarization rotator comprises a pair of variable polarization rotators configured to have substantially opposite angular variation.

41. The dimming device of claim 33 further comprising a third non-absorbing polarizer, the third non-absorbing polarizer receiving the light of the second selected polarization from the second non-absorbing polarizer and passing a portion of the light to the display optics.

42. The dimming device of claim 33 wherein the variable polarization converter is configured such that different spatial portions of the rotator can selectively rotate the polarization of the received light in different amounts by selectively rotating different annular areas in different amounts.

43. The dimming device of claim 33 wherein the variable polarization converter is configured such that different spatial portions of the rotator can selectively rotate the polarization of the received light in different amounts by selectively rotating in a checkerboard pattern.

44. The dimming device of claim 33 wherein the variable polarization rotator is imaged to an aperture stop.

* * * * *